(12) United States Patent
Kwak

(10) Patent No.: US 7,436,904 B2
(45) Date of Patent: Oct. 14, 2008

(54) DATA RECOVERY APPARATUS AND METHOD FOR DECREASING DATA RECOVERY ERROR IN A HIGH-SPEED SERIAL LINK

(75) Inventor: Myoung-Bo Kwak, Incheon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 660 days.

(21) Appl. No.: 10/782,705

(22) Filed: Feb. 19, 2004

(65) Prior Publication Data

US 2004/0165679 A1 Aug. 26, 2004

(30) Foreign Application Priority Data

Feb. 20, 2003 (KR) .................. 10-2003-0010758

(51) Int. Cl.
*H04B 14/04* (2006.01)
(52) U.S. Cl. ............... 375/316; 375/354; 375/355; 327/141; 455/502
(58) Field of Classification Search .......... 375/316, 375/355, 373
See application file for complete search history.

(56) References Cited

U.S. PATENT DOCUMENTS

| 5,528,198 | A | * | 6/1996 | Baba et al. .............. 331/1 A |
| 5,923,151 | A | * | 7/1999 | Satoh ....................... 322/28 |
| 6,081,561 | A | * | 6/2000 | Julyan et al. ............. 375/340 |
| 6,111,712 | A | * | 8/2000 | Vishakhadatta et al. .... 360/51 |
| 6,366,225 | B1 | * | 4/2002 | Ozdemir .................. 341/111 |
| 6,374,360 | B1 | * | 4/2002 | Keeth et al. .............. 713/400 |
| 6,662,304 | B2 | * | 12/2003 | Keeth et al. .............. 713/400 |
| 6,807,233 | B1 | * | 10/2004 | Sato et al. ................ 375/259 |
| 7,103,343 | B2 | * | 9/2006 | Boos ....................... 455/316 |
| 7,116,744 | B2 | * | 10/2006 | Saze et al. ................ 375/371 |
| 2002/0085658 | A1 | * | 7/2002 | Boerstler .................. 375/376 |
| 2002/0154723 | A1 | * | 10/2002 | Nakamura ................ 375/376 |
| 2003/0053385 | A1 | * | 3/2003 | Tobita et al. ............ 369/47.22 |
| 2003/0142773 | A1 | * | 7/2003 | Shirota et al. ............ 375/373 |
| 2004/0096013 | A1 | * | 5/2004 | Laturell et al. ............ 375/316 |

\* cited by examiner

*Primary Examiner*—David C. Payne
*Assistant Examiner*—Leon Flores
(74) *Attorney, Agent, or Firm*—F. Chau & Associates, LLC

(57) ABSTRACT

Provided are a data recovery apparatus and method for recovering (parallel) data from serial data received via a high-speed serial link with a reduced data recovery error rate. The data recovery apparatus includes a clock signal generating circuit and a data recovery circuit. The clock signal generating circuit generates at least two clock signal groups including first and second clock signal groups with different phases for alternate use in the data recovery circuit. The data recovery circuit recovers the data from the serial data by oversampling the serial data using one of the at least two clock signal groups selected based on the number of rising edges of sampling clock signals of the selected clock signal group being within an eye open region of the serial data.

19 Claims, 12 Drawing Sheets

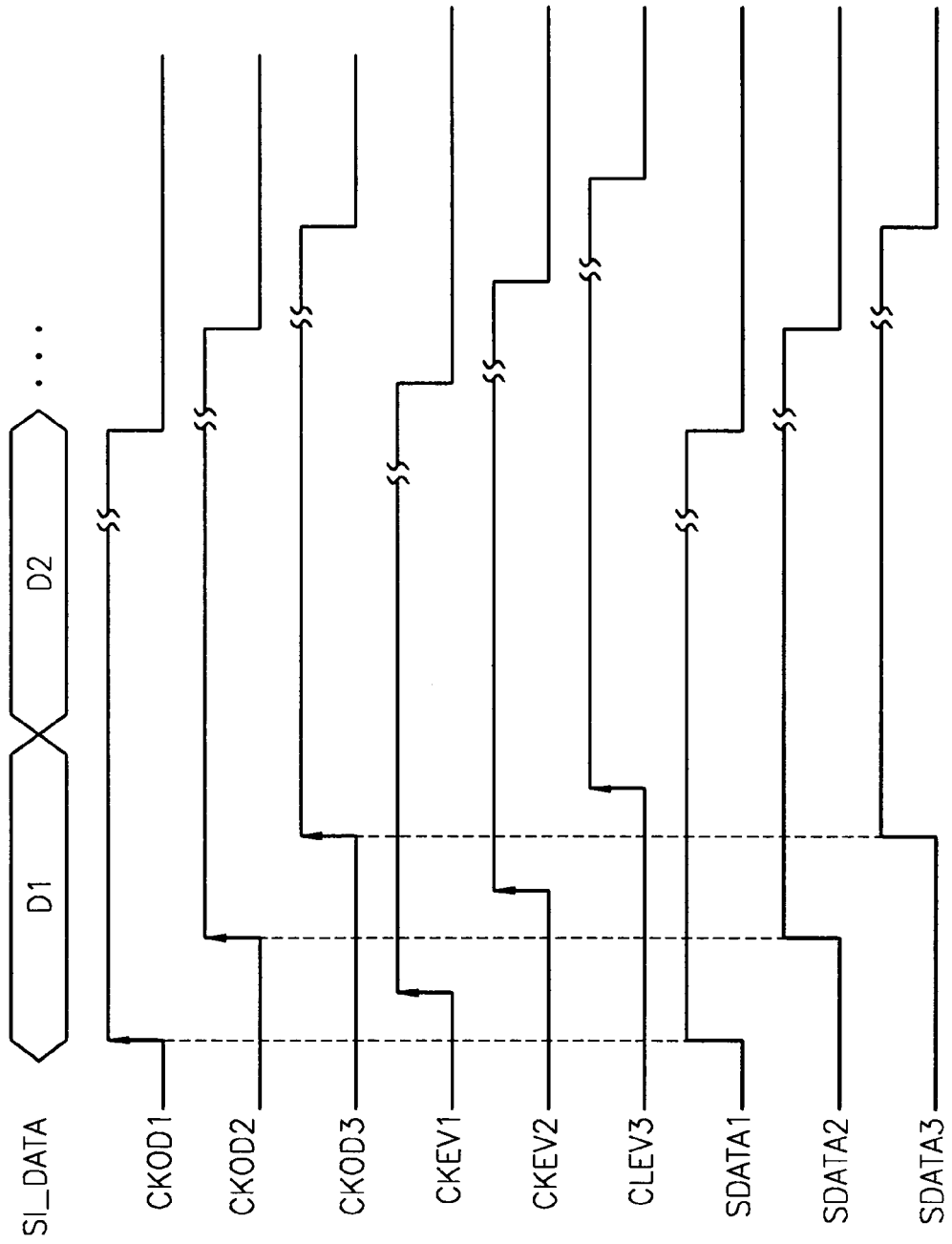

DATA RECOVERY APPARATUS AND METHOD FOR DECREASING DATA RECOVERY ERROR IN A HIGH-SPEED SERIAL LINK

BACKGROUND OF THE INVENTION

1. Field of the Invention

The present invention relates to high-speed serial data communications, and more particularly, to a data recovery apparatus and method for decreasing data recovery error rates in a high-speed serial link.

2. Description of the Related Art

With recent advancements in communication technologies, typical data transmission speeds have approached tens to hundreds of giga bits per second. Serial interface devices, rather than parallel interface devices, are generally used in such ultrahigh-speed communications. This is because the maximum transmission distance and speed of the parallel interface devices are limited due to crosstalk, noise coupling, and the like between bits of transmitted and received data.

The serial interface devices convert parallel data into serial data and then transmit the serial data. The serial interface devices may also receive serial data and convert the serial data into parallel data.

Unlike parallel interface devices, which transmit a clock signal and data at the same time, serial interface devices transmit only data signals containing clock information. The simultaneous transmission of the clock signal and data may result in a skew between the clock signal and the data in a receiver due to very short unit intervals of data, i.e., unit intervals of 1 ns or less, and long transmission distance in ultrahigh-speed communications. Thus, a transmitter converts the clock signal and the data into data containing clock information and then transmits the converted data. Meanwhile, the receiver receives the data and then extracts the clock signal and the data from the received data. A data recovery apparatus performs the extraction of the clock and the data from the (converted) data signal containing the clock information.

The data recovery apparatus may have an oversampling circuit, a tracking circuit, a phase interpolation circuit, or the like.

A conventional data recovery process performed in the oversampling circuit will be described below.

First, a receiver generates a plurality of sampling clock signals and latches received serial data at predetermined intervals using the plurality of sampling clock signals. Next, the receiver detects a transition part from the latched data and outputs data of the latched data outside of the transition part as effective data. Here, the number of sampling clock signal may vary depending on how many data is latched from one data.

A data recovery process performed in the tracking circuit is as follows.

A receiver generates a sampling clock signal fixedly located in the middle of data and also a sampling clock signal for tracking edges of data. Thereafter, the receiver latches received data at predetermined intervals using the two sampling clock signals and detects data latched by the fixed sampling clock signal as effective data.

A data recovery process implemented in the phase interpolation circuit will now be explained.

A receiver generates a plurality of sampling clock signals and also tracking clock signals that track edges of data among the sampling clock signals. Thereafter, the receiver latches the received data using the plurality of sampling clock signals and the tracking clock signals at predetermined intervals and detects data, (sampled outside of a transition part detected by the tracking clock signal), as effective data.

Among the above-described circuits, since the oversampling circuit can be, realized by adopting a low-speed circuit technique, it is frequently used in designing circuits for ultrahigh-speed communications. U.S. Pat. No. 5,587,709 discloses an example of such an oversampling circuit.

However, the conventional oversampling circuit does not tolerate jitter characteristics of the incoming serial data stream, and which may be caused by characteristics of the receiver, due to a multiple phase clocks used for oversampling. As a result, a data recovery error may occur in the conventional oversampling circuit.

A conventional oversampling circuit will be described with reference to FIGS. 1 through 3B.

FIG. 1 is a block diagram of a data recovery apparatus for serial data communications according to the prior art. Referring to FIG. 1, a data recovery apparatus 10 includes a phase-locked loop (PLL) 11, an oversampler 12, and a circuit for clock and data recovery (CDR) circuit 13. The PLL 11 generates a plurality OSR (where OSR is an integer oversampling rate; e.g., OSR equals 3 in the examples herein) of phase clock signals CLKA, CLKB, and CLKC used for sampling and latching received serial data SI_DATA at predetermined intervals. The oversampler 12 latches the serial data SI_DATA at predetermined intervals using the plurality OSR of clock signals CLKA, CLKB, and CLKC and then outputs the corresponding sampling data SD1, SD2, and SD3. The CDR 13 detects a transition part (i.e., a zero crossing in the data stream) from the sampling data SD1, SD2, and SD3 and outputs one of the sampling data SD1, SD2, and SD3 outside) the transition part (zero crossing) as effective data.

The operation of the data recovery apparatus 10 will be explained in more detail with reference to FIG. 2.

FIG. 2 is a timing diagram of major signals for a data recovery operation performed by the data recovery apparatus shown in FIG. 1. FIG. 2 illustrates a case where a triple (OSR=3) oversampling circuit is adapted to recover clock signals and data from differential serial data in a band of several giga bits per second. Referring to FIG. 2, when serial data SI_DATA is received, each 1-bit of serial data D0 through DN are latched to 3 bits of data using clock signals CLKA, CLKB, and CLKC.

For example, when the serial data D0 has a bit value of "1", the serial data D1 and D2 have bit values of "0", and the serial data D3 has bit a value of "1", three bits of sampling data are obtained for each of the serial data D0 through D3. In other words, the sampling data for the serial data D0 is "1, 1, 1", the sampling data for the serial data D1 are "0, 0, 0", and the sampling data for the serial data D2 are "0, 0, 0". Transition parts (serial data zero crossings) P1, P2, and P3 in which a bit value "1" is transited to a bit value of "0" or a bit value of "0" is transited to a bit value of "1" are detected from the sampling data. The possibility for 1-bit sampling data in the samples outside of transition parts P1, P2, and P3 to be effective data is high. Thus, the 1-bit sampling data are output as effective data to recover data from the serial data input stream.

However, a data recovery error is likely to occur in such an oversampling circuit depending on the transition distribution of serial data in sampling clock signals.

A normal data recovery and a data recovery error in the oversampling circuit will be explained with reference to FIGS. 3A through 3C.

FIGS. 3A through 3C are eye diagrams of serial data for explaining a typical data recovery and a data recovery error.

In FIGS. 3A through 3C, a thick solid line with a diamond shape denotes an eye open region of serial data. When sampling data detected as effective data exists in the eye open region, a data recovery error rate is low.

During a data recovery in the oversampling circuit, sampling data outside a transition part TP (zero crossing) is detected as effective data. Thus, an edge of a sampling clock signal (and therefore a sample latched) outside the transition part TP should exist in the eye open region in order to reduce the data recovery error rate.

Referring to FIG. 3A, an edge of a sampling clock signal CLKB outside the transition part TP (a zero-crossing detected between sampling clock signals CLKC and CLKA) exists in the eye open region. Thus, effective data can be detected without an error. Referring to FIGS. 3B and 3C, since edges of sampling clock CLKC and CLKA outside the transition part TP (a detected zero-crossing detected between sampling clock signals CLKA and CLKB or CLKB and CLKC) do not exist in the eye open region, a data recovery error may occur.

As described above, the conventional data recovery apparatus generates an error during a data recovery depending on the transition distribution of serial data sampled by a plurality OSR of oversampling clock signals.

SUMMARY OF THE INVENTION

The present invention provides a data recovery apparatus and method for reducing a data recovery error by generating a plurality (MOSR, wherein MOSR is an integer multiple M of the oversampling rate OSR; e.g., where M=2, MOSR=2× OSR) of sampling clock signals and selecting a first subset or a second (interstitial) subset of the plurality MOSR of sampling clock signals so that a plurality of edges exist in an eye open region of serial data.

According to an aspect of the present invention, there is provided a data recovery apparatus for recovering effective data from serial data received via a high-speed serial link, the data recovery apparatus comprising: a clock signal generating circuit that generates at least two clock signal groups comprising of first and second clock signal groups, wherein each of the first and second clock signal groups are composed of clock signals having different phases; and a data recovery circuit that recovers the effective data from the serial data by oversampling the serial data by using a dynamically selected one of the at least two clock signal groups, the selection depending upon the number of edges of clock signals of the selected one of two clock signal groups being within an eye open region of the serial data.

The data recovery apparatus includes a clock signal generating circuit and a data recovery circuit. The clock signal generating circuit generates at least two clock signal groups (first and second clock signal groups) comprising clock signals having all different phases. The data recovery circuit recovers the effective data from the serial data by selectively using one of the at least two clock signal groups, the selection depending upon indications that a predetermined number of rising edges of clock signals of the at least two clock signal groups fall within an eye open region of the serial data.

According to another aspect of the present invention, there is provided a data recovery method for recovering effective data from serial data, the method being performed by an oversampling data recovery apparatus comprising: a clock signal generating circuit that generates at least two clock signal groups comprising first and second groups of sampling clock signals, wherein every sampling clock signal has a unique phase; and a data recovery circuit that recovers the effective data from the serial data by sampling the serial data by the sampling clock signals of a dynamically selected one of the at least two sampling clock signal groups, wherein the selection of the selected one of the at least two sampling clock signal groups depends on the number of edges of the clock signals of the selected clock signal group being within an eye open region of the serial data.

The data recovery circuit recovers the effective (e.g., parallel) data from the serial data by selectively using one of the at least two clock signal groups the selection being based on the number of rising edges of clock signals of the at least two clock signal groups in an eye open region of the serial data. The at least two clock signal groups include a plurality of sampling clock signals. The data recovery method includes: oversampling a plurality of sampling data from the serial data; counting the number of times zero-crossing transition occurs in each of the plurality of clock sections (between edges of successive clock signals) from the plurality of sampling data and accumulating the counted values relating to each clock signal; comparing the accumulated count values and outputting a counting signal indicating a clock section (a transition part) with the greatest value of the accumulated values; outputting sampling data of the plurality of sampling data latched by the sampling clock signal farthest from (outside) the transition part as effective data.

According to another aspect of the present invention, there is provided a data recovery method for recovering effective data from an input stream of serial data having an eye open region and a plurality of zero-crossing transitions, the method comprising: oversampling each bit of the serial data at an oversampling rate of OSR, and latching OSR bits of sampling-data for each bit of serial data according to a selected one set of OSR sampling clock signals selected from among a first and second set of OSR sampling clock signals, wherein all the 2×OSR sampling clock signals have different phases; and wherein the selected set of OSR sampling clock signals has been dynamically selected so as to sample the serial data by a plurality of sampling clock signals having edges within the eye open region of the serial data.

BRIEF DESCRIPTION OF THE DRAWINGS

The above and other features of the present invention will become more apparent by describing in detail exemplary embodiments thereof with reference to the attached drawings in which:

FIG. 12 is a timing diagram of major signals input to and used within the data recovery apparatus of FIG. 4.

DETAILED DESCRIPTION OF THE INVENTION

Figure 1:
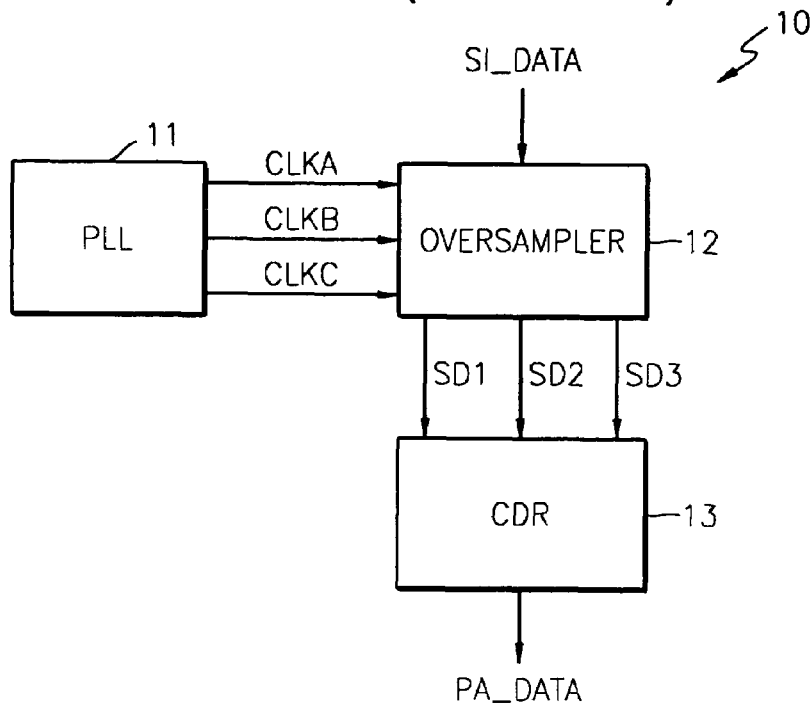
FIG. 1 is a block diagram of a conventional data recovery apparatus for serial data communications.
Figure 2:
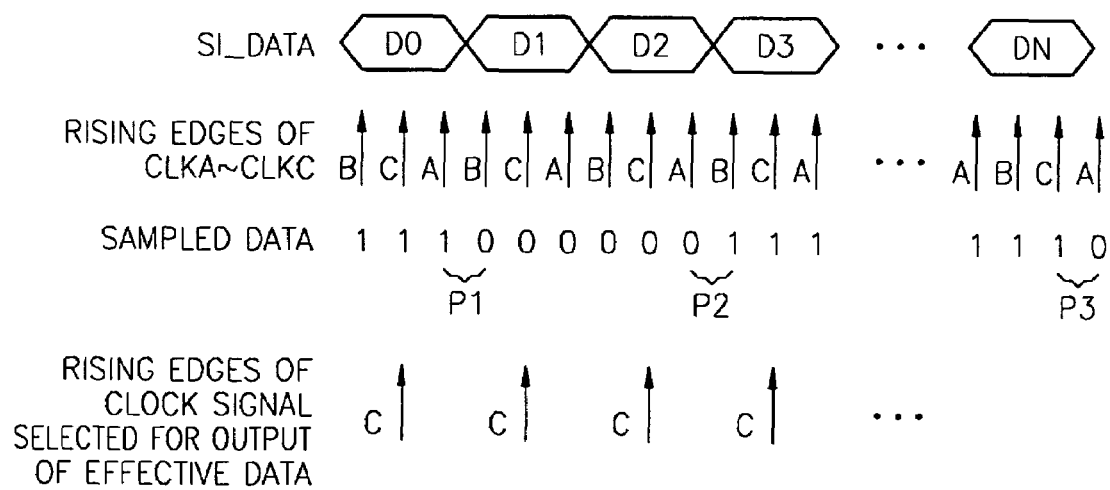
FIG. 2 is a timing diagram of major signals for explaining a data recovery operation of the data recovery apparatus shown in FIG. 1.
Figure 3A:
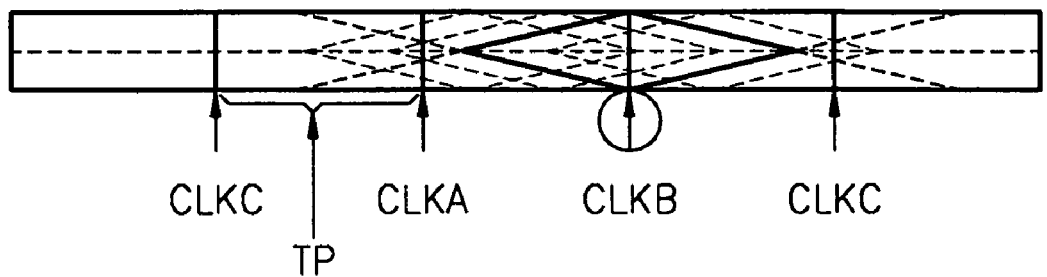
FIGS. 3A through 3C are eye diagrams of serial data for explaining a normal data recovery and a data recovery error.
Figure 3B:
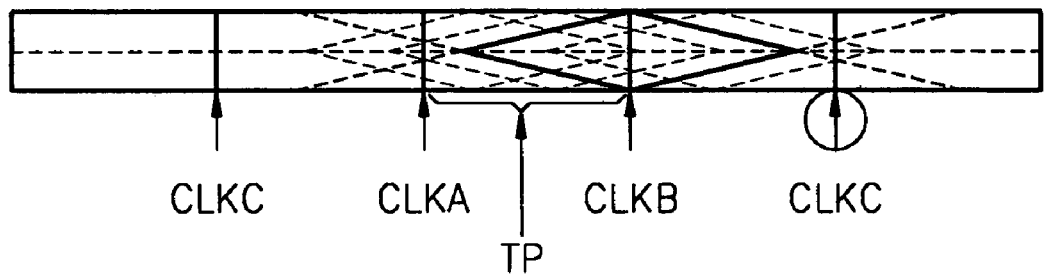
Figure 3C:
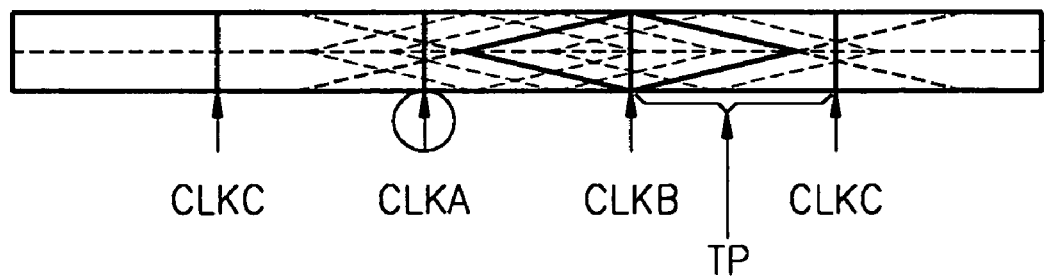

The attached drawings for illustrating a preferred embodiments of the present invention are provided to convey an understanding of exemplary embodiments of the present invention and the operation thereof and results that can be accomplished by the operation of the present invention.

Hereinafter, the present invention will be described in detail by explaining preferred embodiments of the present invention with reference to the attached drawings. Like reference numerals in the drawings denote the same elements.

Figure 4:
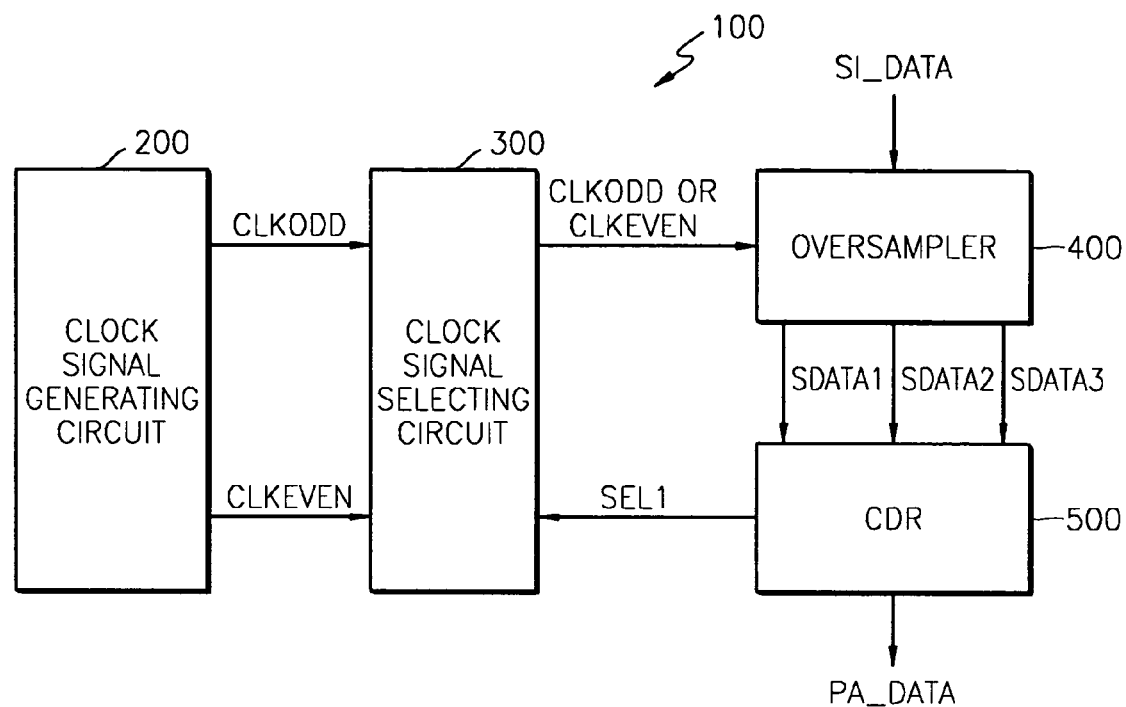
FIG. 4 is a block diagram of a data recovery apparatus for serial data communications in a high-speed serial link, according to an aspect of the present invention.

FIG. 4 is a block diagram of a data recovery apparatus for serial data communications in a high-speed serial link, according to an aspect of the present invention. Referring to FIG. 4, a data recovery apparatus 100 includes a clock signal generating circuit 200, a clock signal selecting circuit 300, an oversampler 400, and a CDR 500. The clock signal generating circuit 200 generates a first clock signal group CLKODD containing a plurality OSR (e.g., OSR=3) of phase-shifted sampling clock signals (e.g., first, second, and third sampling clock signals CKOD1, CKOD2, and CKOD3) and a second clock signal group CLKEVEN containing an equal plurality OSR (e.g., OSR=3) of phase shifted sampling clock signals (e.g., fourth, fifth, and sixth sampling clock signals CKEV1, CKEV2, and CKEV3). The second plurality (OSR) of phase shifted sampling clock signals is timewise interstitial to the first plurality (OSR) of phase shifted sampling clock signals. Here, the number of sampling clock signals contained in the first and second clock signal groups CLKODD and CLKEVEN may vary depending on the desired oversampling rate OSR (OSR=the number of sampled data to be latched for each bit of serial data to be determined).

The clock signal selecting circuit 300 selects and outputs one of the first and second clock signal groups CLKODD and CLKEVEN in response to a clock selection signal SELL.

The oversampler 400 latches received high-speed serial data SI_DATA at predetermined intervals (at the oversampling rate OSR) using the selected one of the first and second clock signal groups (CLKODD or CLKEVEN) output from the clock signal selecting circuit 300 and outputs first, second, and third sampling data SDATA1, SDATA2, and SDATA3.

The CDR 500 detects a transition part (zero crossing in the serial data) from the first, second, and third sampling data SDATA1, SDATA2, and SDATA3, outputs one of the sampling data SDATA1, SDATA2, and SDATA3 farthest from the transition part as effective data, and outputs a plurality of effective data as parallel data PA_DATA.

Figure 5:
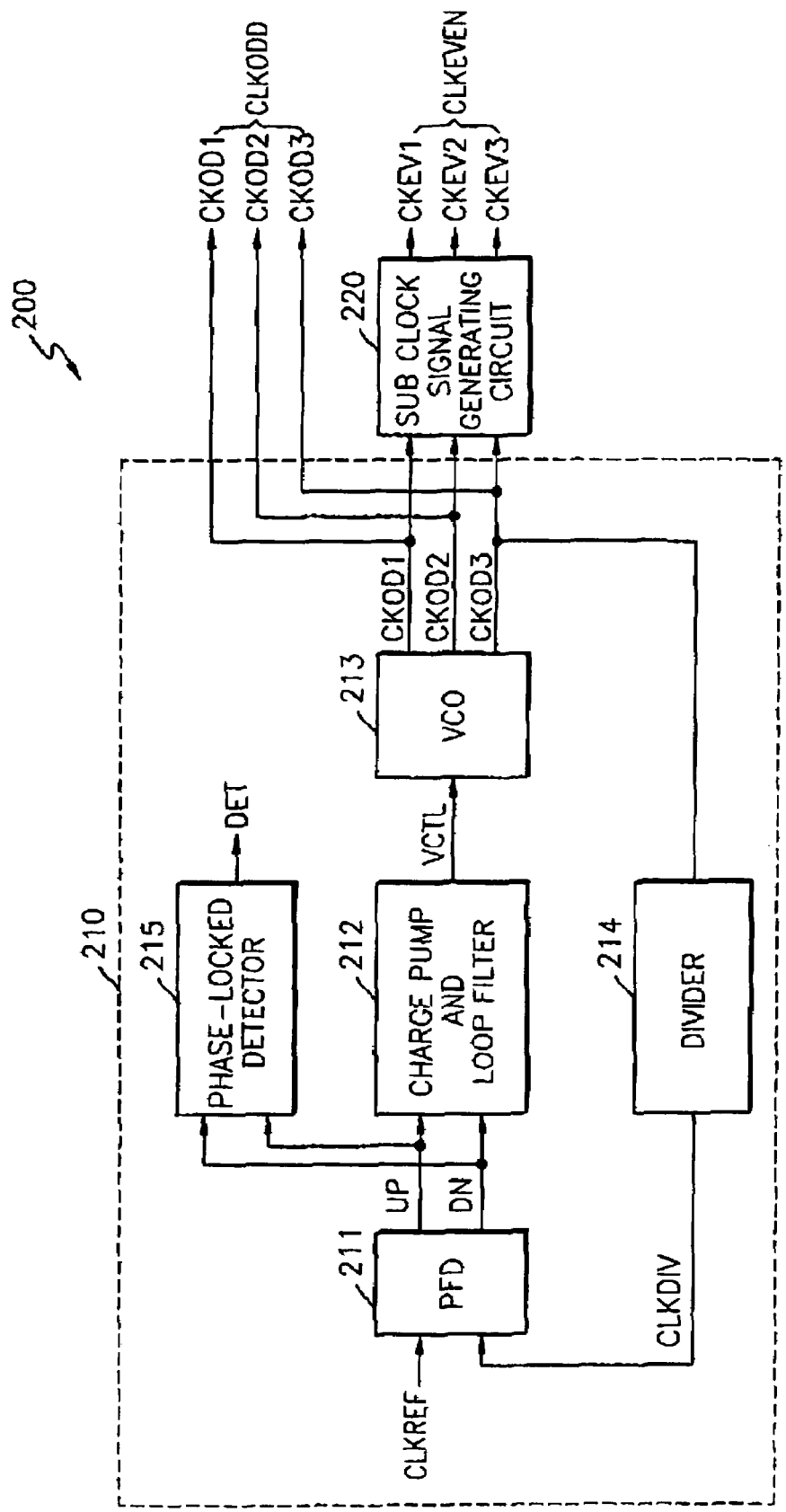
FIG. 5 is a detailed block diagram of a clock signal generating circuit shown in FIG. 4.

FIG. 5 is a detailed block diagram of the clock signal generating circuit 200 shown in FIG. 4. Referring to FIG. 5, the clock generating circuit 200 includes a phase-locked loop PLL 210 and a sub clock signal generating circuit 220. The PLL 210 includes a phase frequency detector (PFD) 211, a charge pump and loop filter 212, a voltage-controlled oscillator VCO 213, a divider 214, and a phase-locked detector 215.

The PFD 211 compares a phase and frequency of a reference clock signal CLKREF with a phase and frequency of a divided clock signal CLKDIV to generate an up signal UP or a down signal DN.

The charge pump and loop filter 212 performs a charge operation or a discharge operation depending on the up signal UP or the down signal DN and outputs a predetermined control voltage VCTL. The VCO 213 outputs the first clock signal group CLKODD containing the first, second, and third (phase-shifted) sampling clock signals CKOD1, CKOD2, and CKOD3 with the same predetermined frequency in response to the control voltage VCTL. The divider 214 divides the third sampling clock signal CKOD3 at a predetermined division ratio to output the division clock signal CLKDIV. Alternatively, the divider 214 may divide the first sampling clock signal CKOD1 or the second sampling clock signal CKOD2.

The phase-locked detector 215 checks whether the up signal UP or the down signal DN is output in order to detect a phase-locked state or a phase-unlocked state and then outputs an indication of the phase-locked state or the phase-unlocked state as a detection signal DET to a controlling unit (not shown).

The sub clock signal generating circuit 220 receives the first clock signal group CLKODD containing OSR (e.g., OSR=3) phase-shifted sampling clock signals and generates the second clock signal group CLKEVEN also containing OSR (OSR=3) phase-shifted sampling clock signals (e.g., the fourth, fifth, and sixth sampling clock signals CKEV1, CKEV2, and CKEV3).

Figure 6:
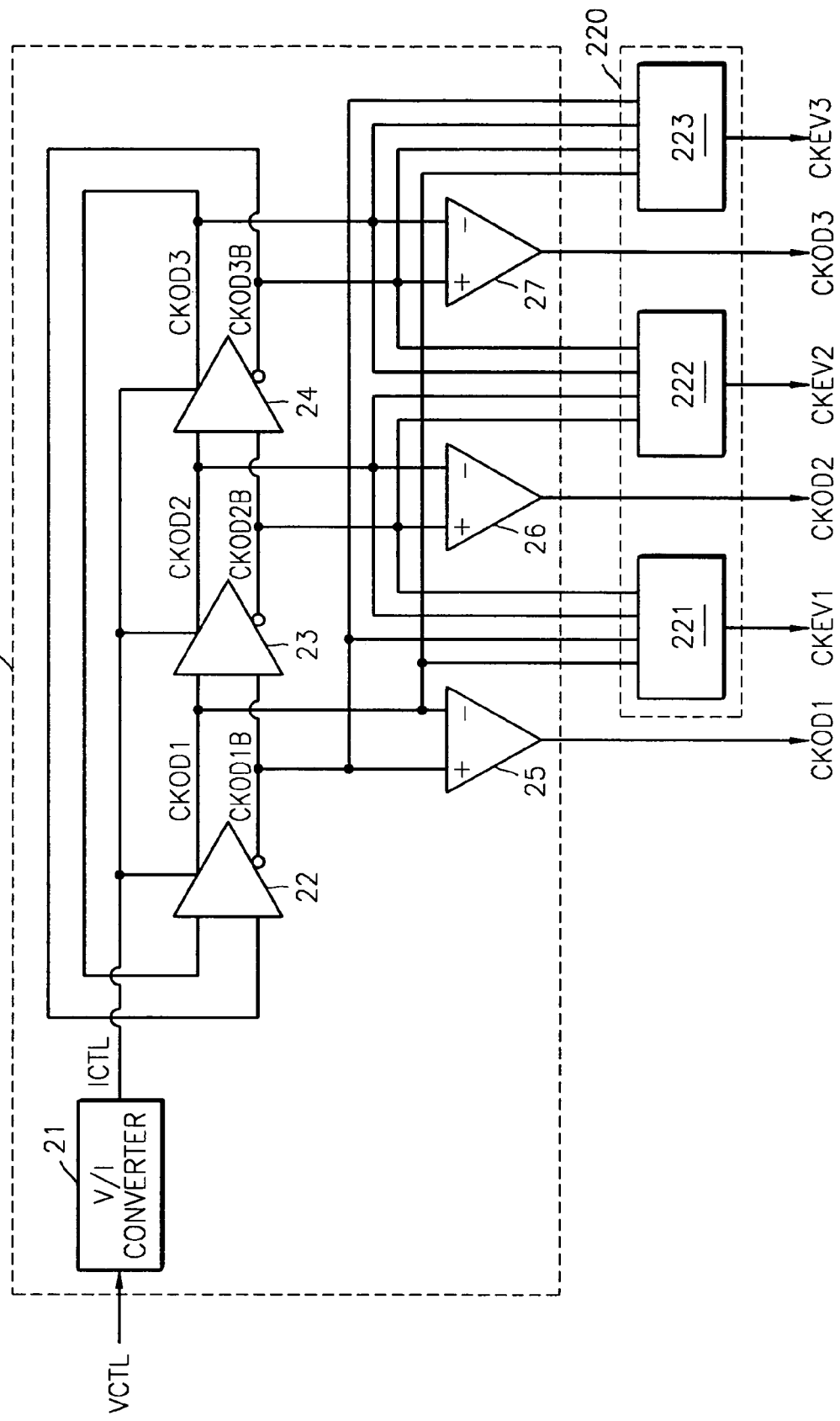
FIG. 6 is a detailed block diagram of a voltage-controlled oscillator (VCO) and a sub clock signal generating circuit shown in FIG. 5.

FIG. 6 is a detailed block diagram of the voltage-controlled oscillator VCO 213 and the sub clock signal generating circuit 220 shown in FIG. 5. Referring to FIG. 6, the voltage-controlled oscillator VCO 213 includes a voltage-to-current (V/I) converter 21, a plurality of delay buffers 22, 23, and 24, and a plurality of output drivers 25, 26, and 27. The V/I converter 21 converts the control voltage VCTL into a control current ICTL. The plurality of delay buffers 22, 23, and 24 are controlled by the control current ICTL so as to output internal clock signals CKOD1 and CKOD1B, CKOD2 and CKOD2B, and CKOD3 and CKOD3B with the same predetermined frequency, respectively. The plurality OSR (e.g., OSR=3) of delay buffers 22, 23, and 24 are connected so that a signal output from a front end of one buffer is input to a rear end of another buffer.

The plurality OSR of output drivers 25, 26, and 27 receive the internal clock signals CKOD1 and CKOD1B, CKOD2 and CKOD2B, and CKOD3 and CKOD3B, respectively, to output OSR sampling clock signals (e.g., the first, second, and third sampling clock signals CKOD1, CKOD2, and CKOD3) of the first clock signal group CLKODD, respectively.

The sub clock signal generating circuit 220 may include a plurality OSR of interpolators 221, 222, and 223. The interpolator 221 receives the internal clock signals CKOD1 and CKOD1 B, and CKOD2 and CKOD2B, the interpolator 222 receives the internal clock signals CKOD2 and CKOD2B, CKOD3 and CKOD3B, and the interpolator 223 receives the internal clock signals CKOD3 and CKOD3B, CKOD1 and CKOD1 B. The plurality OSR of interpolators (221, 222, and 223) output the second (interstitial) plurality OSR of sampling clock signals (e.g., fourth, fifth, and sixth sampling clock signals CKEV1, CKEV2, and CKEV3) of the second clock signal group CLKEVEN, respectively.

Figure 7:
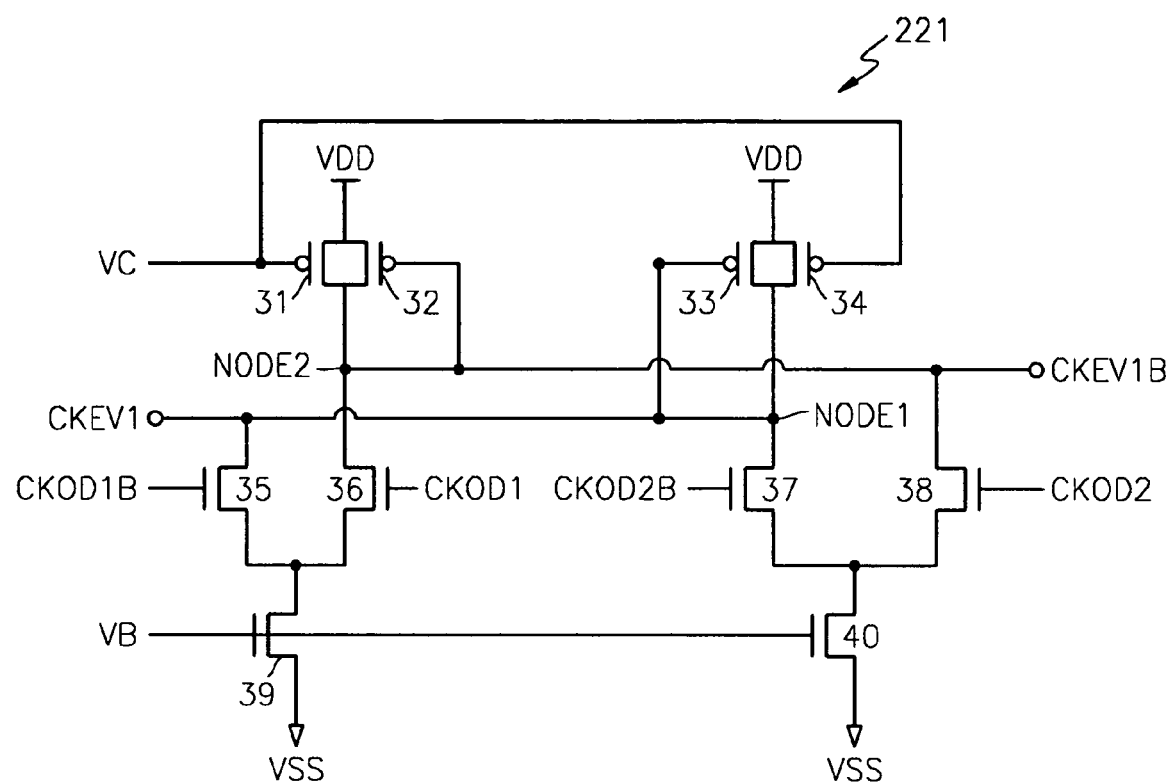
FIG. 7 is a detailed circuit diagram of an interpolator shown in FIG. 6.

FIG. 7 is a detailed circuit diagram of the interpolator 221 shown in FIG. 6. Referring to FIG. 7, the interpolator 221 includes a plurality of p-type Field-Effect Transistor (FET) switches, e.g., positive channel metal-oxide semiconductor (PMOS) transistors, 31 through 34; and a plurality of n-type Field-Effect Transistor (FET) switches, e.g., negative channel metal-oxide semiconductor (NMOS) transistors, 35 through 40. The interpolator 221 outputs the fourth sampling clock signals CKEV1 and CKEV1B of the second clock signal group CLKEVEN to the first node NODE1 and the second node NODE2, respectively.

A predetermined control voltage VC is input to gates of the PMOS transistors 31 and 34. A gate of the PMOS transistor 33 is connected to a first node NODE1, and a gate of the PMOS transistor 32 is connected to a second node NODE2. Sources of the PMOS transistors 31 and 32 are connected to an internal voltage VDD, and drains of the PMOS transistors 31 and 32 are connected to the second node NODE2. Sources of the PMOS transistors 33 and 34 are connected to the internal voltage VDD, and drains of the PMOS transistors 33 and 34 are connected to the first node NODE1.

The internal clock signals CKOD1B and the CKOD2B are input to gates of the NMOS transistors 35 and 37, respectively, and drains of the NMOS transistors 35 and 37 are connected to the first node NODE1.

The internal clock signals CKOD1 and CKOD2 are input to gates of the NMOS transistors 36 and 38, and drains of the NMOS transistors 36 and 38 are connected to the second node NODE2.

Sources of the NMOS transistors 35 and 36 are connected to a drain of the NMOS transistor 39, and sources of the NMOS transistors 37 and 38 are connected to a drain of the NMOS transistor 40.

A predetermined bias voltage VB is input to gates of the NMOS transistors 39 and 40, and a ground voltage VSS is input to sources of the NMOS transistors 39 and 40. The operation of the interpolator 221 can be understood by those of ordinary skill in the art and thus will not be described herein. The interpolators 222 and 223 have the same structures as the interpolator 221 and thus will not be explained.

An edge of the fourth sampling clock signal CKEV1 may be fixed between edges of the first and second sampling clock signals CKOD1 and CKOD2 depending on current drive capabilities of the NMOS transistors 39 and 40.

For example, when the current drive capability of the NMOS transistor 39 is greater than the current drive capability of the NMOS transistor 40, the edge of the fourth sampling clock signal CKEV1 is biased toward the edge of the first sampling clock signal CKOD1. In contrast, the current drive capability of the NMOS transistor 40 is greater than the current drive capability of the NMOS transistor 39, the edge of the fourth sampling clock signal CKEV1 is biased toward the edge of the second sampling clock signal CKOD2.

In the present invention, it is preferable that the edge of the fourth sampling clock signal CKEV1 is located half way between the edges of the first and second sampling clock signals CKOD1 and CKOD2. In other embodiments of the invention, such as for example where a third plurality OSR of (interstitial) sampling clock signals may be employed as a third clock signal group, the edge of the fourth sampling clock signal can be located one third of the way between the edges of the first and second sampling clock signals CKOD1 and CKOD2.

Figure 8:
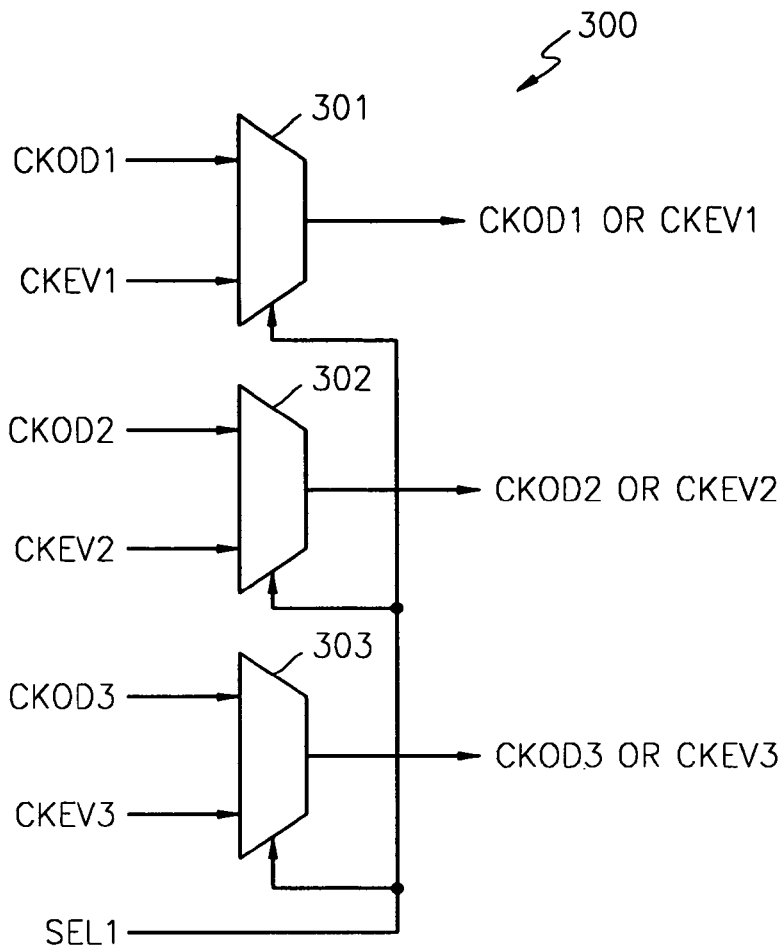
FIG. 8 is a detailed circuit diagram of a clock signal selecting circuit shown in FIG. 4.

FIG. 8 is a detailed circuit diagram of the clock signal selecting circuit 300 shown in FIG. 4. Referring to FIG. 8, the clock signal selecting circuit 300 may include a plurality of multiplexers 301, 302, and 303. The plurality OSR of multiplexers 301, 302, and 303 collectively output one of the first group (containing a plurality OSR) and the second group (also containing a plurality OSR) of sampling clock signals according to the selection control signal SELL. The plurality of multiplexers 301, 302, and 303 receive the first and fourth sampling clock signals CKOD1 and CKEV1, the second and fifth sampling clock signals CKOD2 and CKEV2, and the third and sixth sampling clock signals CKOD3 and CKEV3, respectively.

The multiplexer 301 outputs the first sampling clock signal CKOD1 or the fourth sampling clock signal CKEV1 in response to a selection control signal SEL1, the multiplexer 302 outputs the second sampling clock signal CKOD2 or the fifth sampling clock signal CKEV2 in response to the selection control signal SEL1, and the multiplexer 303 outputs the third sampling clock signal CKOD3 or the sixth sampling clock signal CKEV3 in response to the selection control signal SELL.

Figure 9:
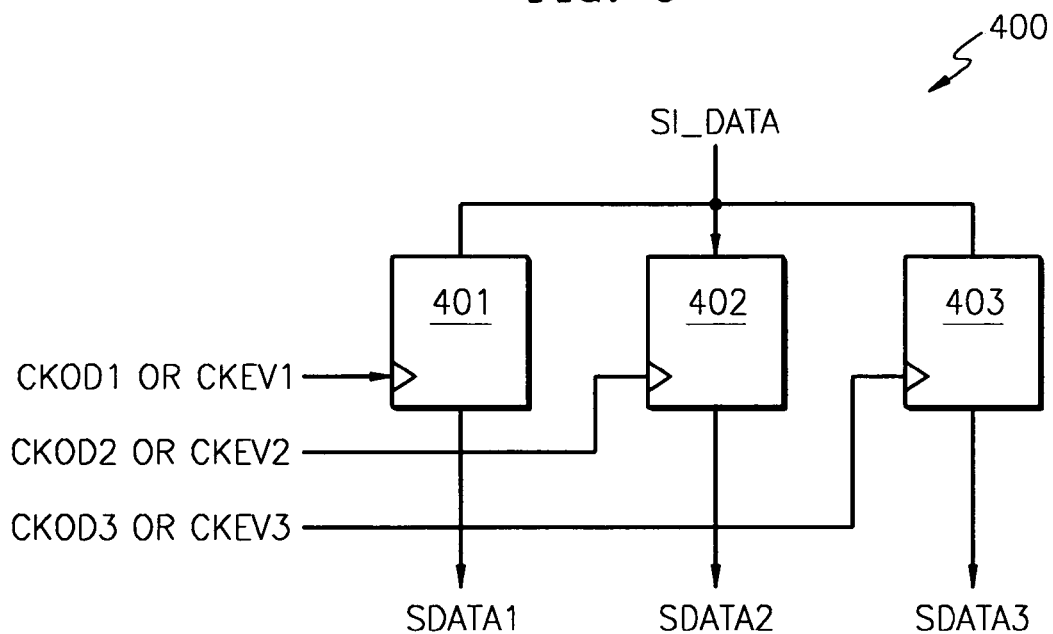
FIG. 9 is a detailed block diagram of an oversampler shown in FIG. 4.

FIG. 9 is a detailed block diagram of the oversampler 400 shown in FIG. 4. Referring to FIG. 9, the oversampler 400 may include a plurality OSR (e.g., OSR=3) of latch circuits (e.g., 401, 402, and 403). Here, the number of latch circuits may vary depending on the oversampling ratio (OSR) the number of sampling data bits to be latched per each bit of serial data. In alternative embodiments of the invention, the number of latch circuits may equal MOSR (MOSR=M×OSR) wherein M equals the number of sampling clock signal groups (e.g., M=2 in the exemplary embodiments herein) and wherein the plurality OSR of multiplexers (e.g., 301, 302, and 303) multiplex the plurality MOSR of outputs from the plurality MOSR of latch circuits.

The plurality OSR of latch circuits (e.g., 401, 402, and 403) latch the received serial data SI_DATA in response to the first sampling clock signal CKOD1 (or the fourth sampling clock signal CKEV1), the second sampling clock signal CKOD2 (or the fifth sampling clock signal CKEV2), and the third sampling clock signal CKOD3 (or the sixth sampling clock signal CDKV3), and then output the first, second, and third sampling data SDATA1, SDATA2, and SDATA3, respectively.

Figure 10:
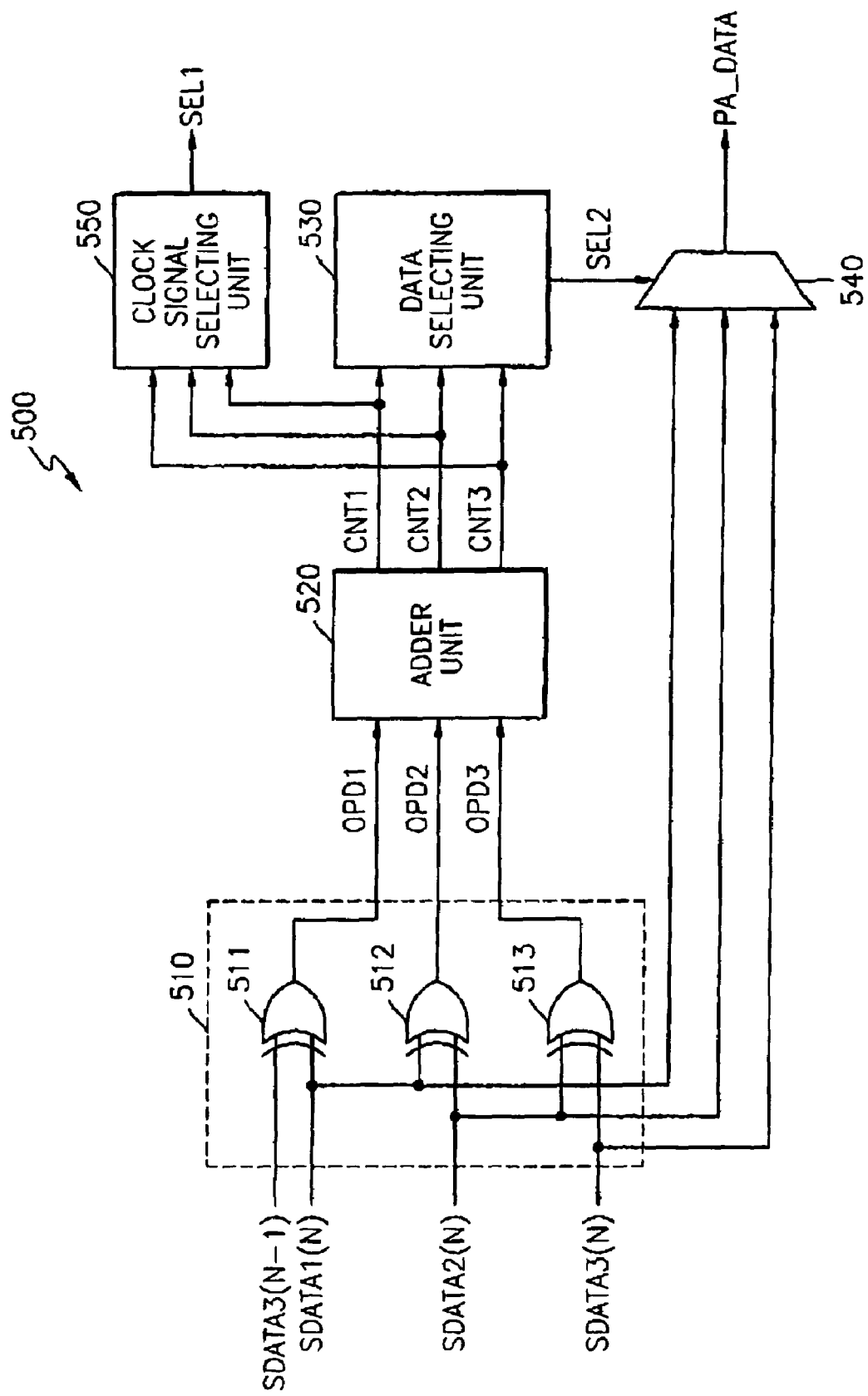
FIG. 10 is a detailed block diagram of a CDR shown in FIG. 4.

FIG. 10 is a detailed block diagram of the CDR 500 shown in FIG. 4. Referring to FIG. 10, the CDR 500 includes a transition detecting unit 510, an adder unit 520, a data-selecting unit 530, a data output unit 540, and a clock signal-selecting unit 550.

The transition-detecting unit 510 may include plurality OSR of XOR-gates (e.g., first, second, and third XOR gates 511, 512, and 513). The first XOR-gate 511 performs an exclusive OR (XOR) operation on previously received third sampling data SDATA3 (N−1) and currently received first sampling data SDATA1 (N) to output a first internal signal OPD1. Here, N is an integer equal to or greater than 1. The second XOR-gate 512 performs an XOR operation on the first sampling data SDATA1 (N) and second sampling data SDATA2 (N) to output a second internal signal OPD2. The third XOR-gate 513 performs an XOR operation on the second sampling data SDATA2 (N) and third sampling data SDATA3 (N) to output a third internal signal OPD3.

The plurality OSR of internal signals (e.g., first, second, and third internal signals OPD1, OPD2, and OPD3) are used to determine whether transitions (indicating zero crossings of serial data) occur between consecutive sampling clock signals. This will be explained in more detail.

Let us assume that sampling clock signals selected (by selection control signal SEL1) to latch the first, second, and third sampling data SDATA1 (N), SDATA2 (N), and SDATA3 (N) are the first, second, and third sampling clock signals CKOD1, CKOD2, and CKOD3 of the first clock signal group CLKODD. For convenience, the time span between a rising edge of the first sampling clock signal CKOD1 and a rising edge of the second sampling clock signal CKOD2 is called a first clock section, the time span between the rising edge of the second sampling clock signal CKOD2 and a rising edge of the third sampling clock signal CKOD3 is called a second clock section, and the time span between the rising edge of the third sampling clock signal CKOD3 and the rising edge of the first sampling clock signal CKOD1 is called a third clock section.

For example, when the first internal signal OPD1 has a bit value of "1", this indicates that a sampling data value is transited (indicating a zero-crossing in the serial data) in the first clock section. Determinations are made from the second and third internal clock signals OPD2 and OPD3 whether sampling data values are transited (indicating a zero-crossing in the serial data) in the second and third clock sections.

The adder unit 520 receives the first, second, and third internal signals OPD1, OPD2, and OPD3, counts the number times a transition occurs in each of the plurality OSR (e.g., first, second, and third) of clock sections, and accumulates each counted value for a predetermined period of time.

The adder unit 520 compares the plurality OSR of accumulated count values, detects the clock section in which the number of times (the count) that transition (i.e., a transition part TP) occurs is the highest, and outputs counting signals CNT1, CNT2, and CNT3 as the detection result. The data-selecting unit 530 outputs a predetermined data selection signal SEL2 in response to the counting signals CNT1, CNT2, and CNT3. In more detail, when a number of times transition (TPs) occurs is the highest in the first clock section, the adder unit 520 outputs the counting signals CNT1, CNT2, and CNT3 as "100". The predetermined data selection signal SEL2 is used to select the data sampled farthest from a clock section in which a number of times transition occurs is the highest. For the example where OSR equals 3, and when the counting signals CNT1, CNT2, and CNT3 are "100", the predetermined data selection signal SEL2 controls the data output unit 540 so as to output the third sampling data SDATA3 latched by the third sampling clock signal CKOD3 as effective data.

The clock signal selecting unit 550 monitors the counting signals CNT1, CNT2, and CNT3 to output the clock selection signal SELL so that the first clock signal group CLKODD is transited into the second clock signal group CLKEVEN (i.e, the first clock signal group CLKODD is deselected and the second clock signal group CLKEVEN is selected) when all the first, second, and third clock sections have been transition parts.

The clock signal selecting unit 550 performs an OR operation on the counting signals CNT1, CNT2, and CNT3 for a predetermined period of time (e.g., a predetermined number of serial data bit cycles) to determine whether transitions (TPs) have taken place in all the plurality OSR (e.g., first, second, and third) clock sections. To be more specific, when the counting signals CNT1, CNT2, and CNT3 are sequentially input as "100", "010", and "100", an OR operation is performed on "100", "010", and "100", which results in "110". As the result of the OR operation, determination can be made from "100" that the transitions (TPs) occur in the first and the second clock sections. When next the counting signals CNT1, CNT2, and CNT3 are input as "001", the result of an OR operation on "110" and "001" is "111". The clock signal selecting unit 550 can determine from the OR result "111" that the transitions (TPs) have occurred in the first, second, and third clock sections. In other words, the clock signal-selecting unit 550 has determined that all of the first, second, and third clock sections have transited into transition parts (TPs) within the predetermined period of time.

Figure 11A:
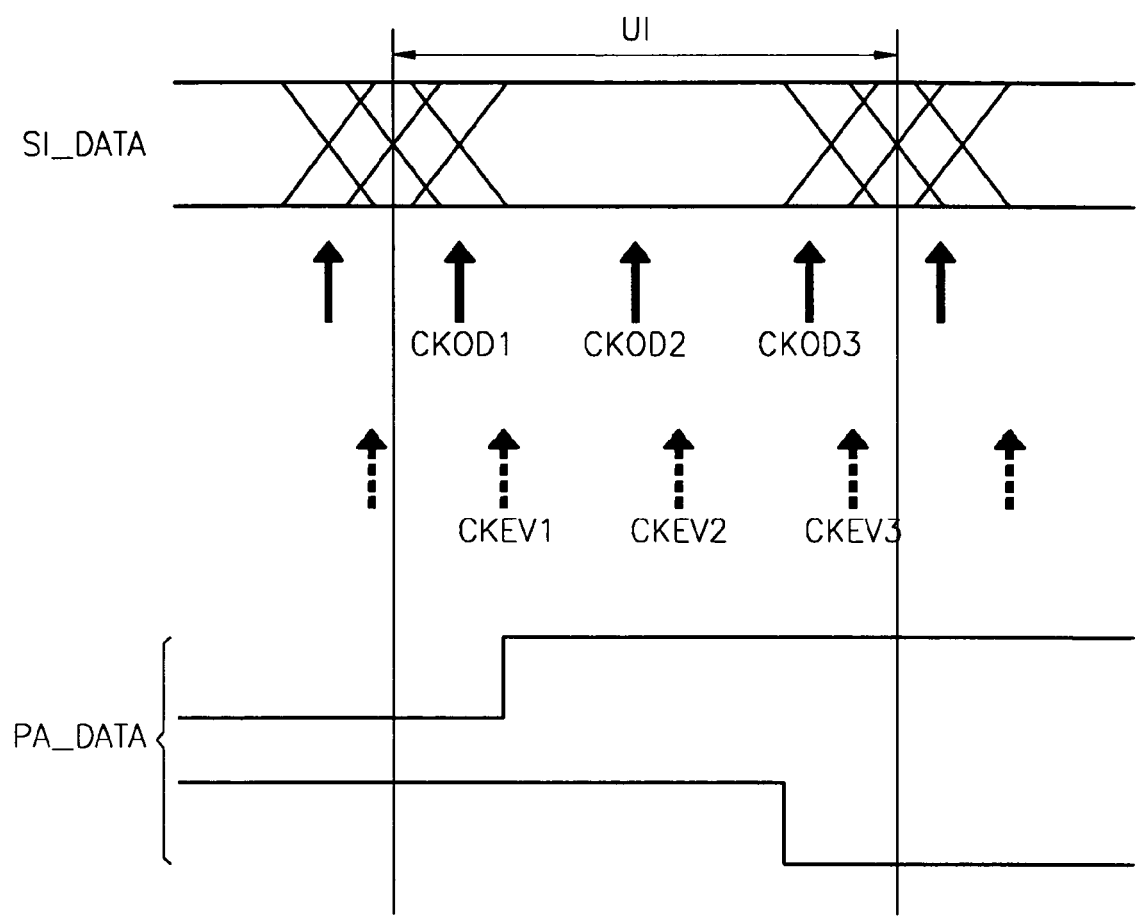
FIGS. 11A and 11B are timing diagrams showing edges of sampling clock signals and serial data used in the data recovery apparatus shown in FIG. 4.
Figure 11B:
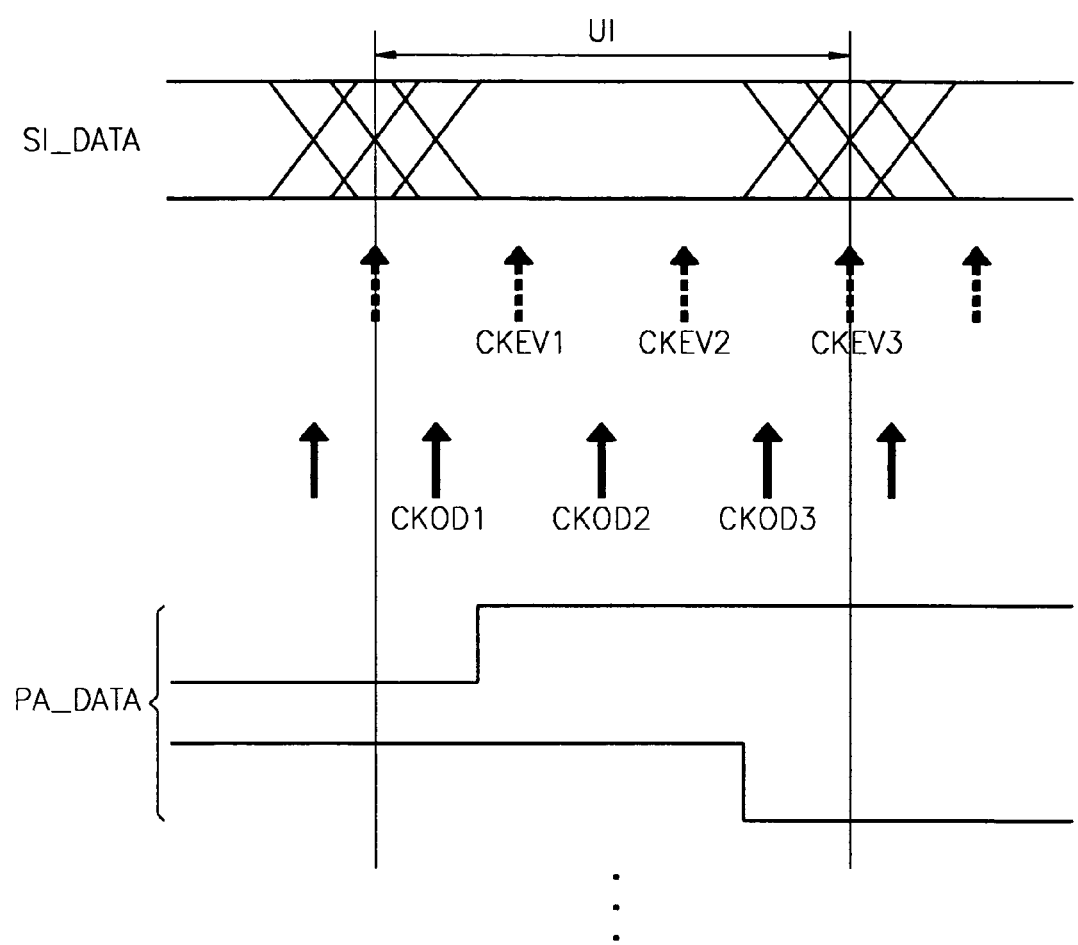

As illustrated in FIG. 11A, the change of all of the first, second, and third clock sections into the transition parts indicates that only one of the first, second, and third sampling clock signals of the first clock signal group CKODD has a rising edge in an eye open region of serial data. Thus, a data recovery error may occur. Therefore, as shown in FIG. 11B, the first plurality OSR of sampling clock signals (e.g., the first, second, and third sampling clock signals CKOD1, CKOD2, and CKOD3 of the first clock signal group CLKODD) should be deselected (by the selection control signal SELL) and transited into the second (interstitial) plurality OSR of sampling clock signals (e.g., the fourth, fifth, and sixth clock signals CKEV1, CKEV2, and CKEV3 of the second clock signal group CLKEVEN) so that a plurality (e.g., 2) of rising edges exist in the eye open region. In FIGS. 11A and 11B, the first clock signal group CLKODD is changed into the second clock signal group CLKEVEN. However, the reverse case (wherein the second plurality OSR of sampling clock signals should be deselected and transited into the first plurality OSR of sampling clock signals) is possible depending on the number of rising edges detected in the eye open region. In this manner, the plurality OSR of phase-shifted sampling clock signals can be effectively phase-shifted forward or backward by an amount less than (e.g, one half of) the full period of the oversampling frequency (Serial Data Bit frequency×OSR), thereby increasing the effective oversampling rate, and/or tracking and correcting for the jitter characteristic of the incoming serial data stream.

The operation of the data recovery apparatus having the above-described structure will be described with reference to FIGS. 4 and 13.

FIG. 12 is a timing diagram of major signals input to and output from the data recovery apparatus shown in FIG. 4.

Prior to the description of the operation of the data recovery apparatus of the present invention, let us assume that the first clock signal group CLKODD containing the first, second, and third sampling clock signals CKOD1, CKOD2, and CKOD3 is set. In addition, a gap between a rising edge of the first sampling clock signal CKOD1 and a rising edge of the second sampling clock signal CKOD2 is called a first clock section, a gap between the rising edge of the second sampling clock signal CKOD2 and a rising edge of the third sampling clock signal CKOD3 is called a second clock section, and a gap between the rising edge of the third sampling clock signal CKOD3 and the rising edge of the first sampling clock signal CKOD1 is called a third clock section.

Figure 13:
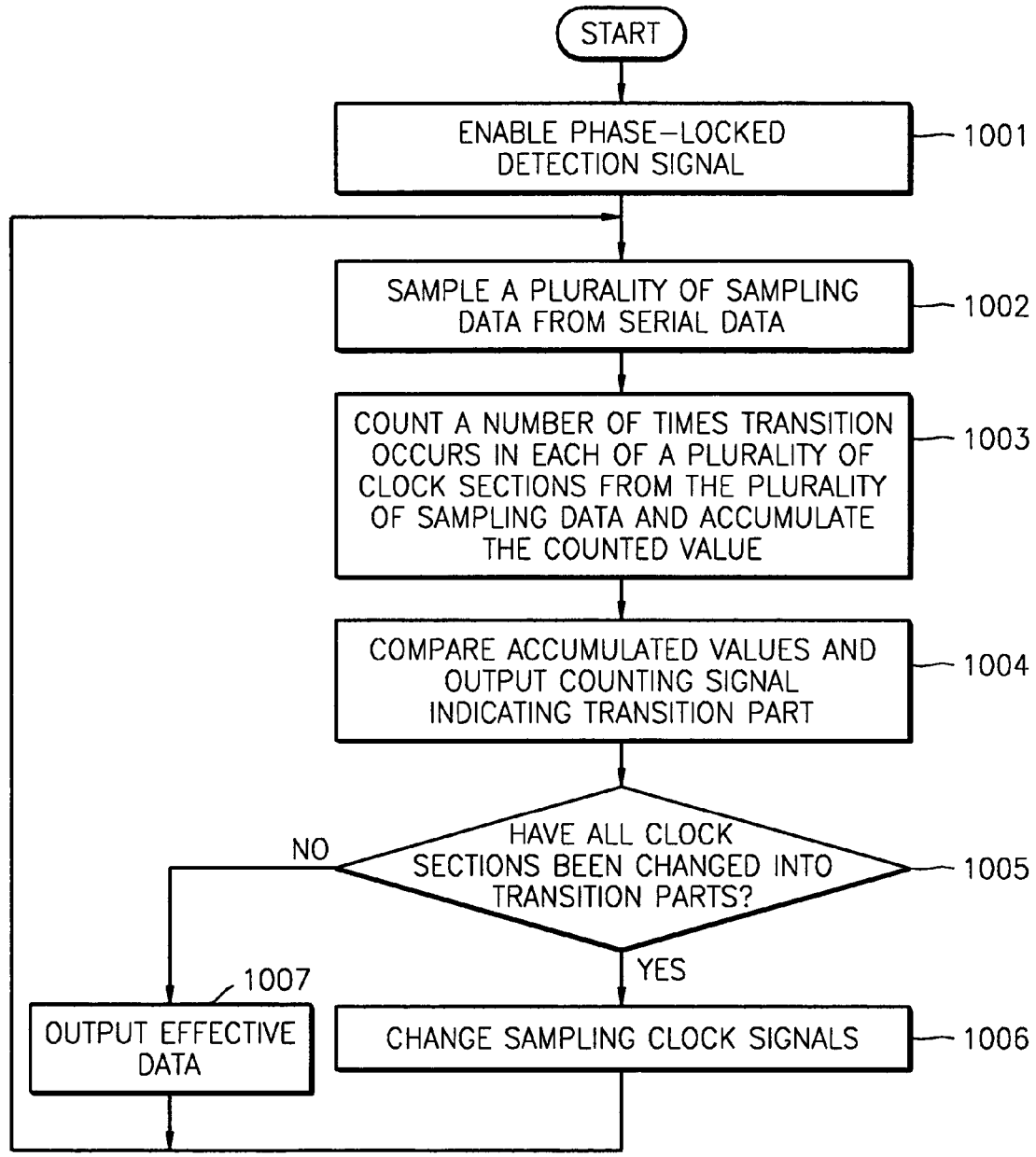
FIG. 13 is a flowchart of a data recovery method performed by the data recovery apparatus of FIG. 4.

FIG. 13 is a flowchart of a data recovery method performed by the data recovery apparatus of FIG. 4. In step 1001 in FIG. 13, a phase-locked detection signal DET is enabled, indicating a stable sampling clock signal frequency is available. In step 1002, the oversampler 400 samples a plurality OSR of sampling data (e.g., SDATA1, SDATA2, and SDATA3 where OSR=3) from serial data SI_DATA. As shown in FIG. 12, the oversampler 400 latches the serial data SI_DATA at predetermined intervals (according to the OSR) to output the first, second, and third sampling data SDATA1, SDATA2, and SDATA3 in response to the first, second, and third sampling clock signals CKOD1, CKOD2, and CKOD3.

The transition-detecting unit 510 of the CDR 500 (FIGS. 4 and 10) detects from the plurality OSR of sampling data (e.g., SDATA1, SDATA2, and SDATA3) whether transitions occur in the plurality OSR (e.g., first, second, and third) clock sections. The transition detecting unit 510 performs a Boolean logic operation (e.g., XOR comparisons between) on input sampling data SDATA1 (N), SDATA2 (N), and SDATA3 (N−1) to output the plurality OSR (e.g., first, second, and third) of internal signals (OPD1, OPD2, and OPD3). Determinations are made from the plurality OSR of internal signals (OPD1, OPD2, and OPD3) whether the transitions (TPs) occur in each of the plurality OSR (e.g., first, second, and third) clock sections. For example, when the first internal signal OPD1 has a bit value of "1", this indicates that transition (TP) takes place in the first clock section. In contrast, when the first internal signal OPD1 has a bit value of "0", this indicates that the transition (TP) does not occur in the first clock section.

Like the first internal signal OPD1, the second and third internal signals OPD2 and OPD3 indicate whether or not transitions (TPs) occur in the second and third clock sections, respectively.

In step 1003, the adder unit 520 of the CDR 500 counts the number of times the transition occurs in each of the plurality OSR (e.g., first, second, and third) clock sections and accumulates each count value. In more detail, the adder unit 520 adds one to the running counts of the number of times a transition (TP) occurs in each of the first, second, and third clock sections whenever the first, second, and third internal signals OPD1, OPD2, and OPD3 have bit values of "1" and accumulates the counted value for a predetermined period of time.

In step 1004, the adder unit 520 compares the accumulated count values of the plurality OSR (e.g., first, second, and third) of clock sections to output the counting signals CNT1, CNT2, and CNT3 indicating the clock section (e.g., among of the first, second, and third clock sections) in which the number of times transition (TP) has occurred within a predetermined period of time is the highest.

In step 1005, the clock signal selecting unit 550 monitors the counting signals CNT1, CNT2, and CNT3 to determine whether all of the first, second, and third clock sections have been transition parts (TPs).

If in step 1005, the determination is made that all of the first, second, and third clock sections have been transition parts, in step 1006, the first, second, and third sampling clock signals CKOD1, CKOD2, and CKOD3 of the first clock signal group CKODD are transited into the fourth, fifth, and sixth sampling clock signals CKEV1, CKEV2, and CKEV3 of the second clock signal group CLKEVEN. Such change of all of the first, second, and third clock sections into the transition parts indicates that (at least) one rising edge of a sampling clock signal exists in the eye open region of the serial data. The process returns to step 1002 to repeat the above steps.

If in step 1005, the determination is made that all of the first, second, and third clock sections have not been transition parts, in step 1007, sampling data farthest from the transition part is output as effective data. The process returns to step 1002 to repeat the above steps.

For a predetermined period of time, the output of the effective data in step 1007 is performed. For example, when the first, second, and third sampling clock signals CKOD1, CKOD2, and CKOD3 of the first clock signal group CKODD are transited into the fourth, fifth, and sixth sampling clock signals CKEV1, CKEV2, and CKEV3 of the second clock signal group CLKEVEN, serial data latched by the right (forward) one of edges of two sampling clocks in the eye open region is output as effective data. In addition, when the fourth, fifth, and sixth sampling clock signals CKEV1, CKEV2, and CKEV3 of the second clock signal group CLKEVEN are transited into the first, second, and third sampling clock signals CKOD1, CKOD2, and CKOD3 of the first clock signal group CKODD, data latched by the left (rearward) one of the edges of two sampling clocks in the eye open region is output as effective data. The predetermined period of time is measured from a point in time when the first, second, and third sampling clock signals CKOD1, CKOD2, and CKOD3 of the first clock signal group CKODD are transited into the fourth, fifth, and sixth sampling clock signals CKEV1, CKEV2, and CKEV3 of the second clock signal group CLKEVEN in step 1006, to a point in time when sampling data latched by the fourth, fifth, and sixth sampling clock signals CKEV1, CKEV2, and CKEV3 are input.

As described above, a data recovery apparatus and method according to the present invention can generate sampling clock signals located (phase-shifted) so that a plurality of edges exist in an eye open region of serial data. As a result, the data recovery error rate can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims, wherein "OSR" is an integer number that denotes the oversampling rate (ratio).

What is claimed is:

1. A data recovery apparatus for recovering effective data from serial data, the data recovery apparatus comprising:
   a clock signal generating circuit that generates at least two groups of clock signals, comprising first and second groups of clock signals, first group of clock signals comprising N phase shifted clock signals of an oversampling rate of N, the second group of signals comprising N phase shifted clock signals of the same oversampling rate and being timewise interstitial to the first group of signals, wherein N is greater than 1;
   an oversampler to sample the serial data at the oversampling rate of N using a selected one of the clock signal groups to generate sampling data; and
   a data recovery circuit that recovers the effective data from the serial data by analyzing the sampling data to determine whether a transition has occurred in the sampling data during clock sections of the currently selected group of clock signals and selecting a different one of the groups of clock signals to be used by the oversampler based on how many of the clock sections the transition has occurred.

2. The data recovery apparatus of claim 1, wherein the data recovery circuit further comprises:
   a clock signal selecting circuit that selects one of the different groups of clock signals response to a clock selection signals,
   wherein the oversampler latches the serial data in response to the selected group of clock signals output N bits of the sampling data per each bit of the serial data; and
   wherein the data recovery circuit selects one of the N bits of the sampling data per each bit of the serial data as effective data and outputs the clock selection signal in response to logic values of the bits of the sampling data.

3. The data recovery apparatus of claim 2, wherein the clock signal generating circuit comprises:
   a phase-locked loop that generates the first and second groups of N phase shifted clock signals.

4. The data recovery apparatus of claim 2, wherein the clock signal generating circuit comprises:
   a phase-locked loop that generates the first group of N phase shifted clock signals; and
   a sub-clock signal generating circuit that generates the second group of N phase shifted clock signals.

5. The data recovery apparatus of claim 1, wherein N is at least 3, and the second group of clock signal comprises N clock signals having multiple phases that are all different from the N phases of the first group of clock signals.

6. The data recovery apparatus of claim 5, wherein the phase-locked loop generates first, second, and third sampling clock signals such that rising edges of the first, second, and third sampling clock signals are arranged at equal intervals, and the sub-clock signal generating circuit generates fourth, fifth, and sixth sampling clock signals so that rising edges of the forth, fifth, and sixth sampling clock signals are arranged at equal intervals.

7. The data recovery apparatus of claim 5, wherein the sub-clock signal generating circuit comprises:
- a first sub-clock signal generating circuit that generates the fourth sampling clock signal in response to the first and second sampling clock signals;
- a second sub-clock signal generating circuit that generates the fifth sampling clock signal in response to the second and third sampling clock signals; and
- a third sub-clock signal generating circuit that generates the sixth sampling clock signal in response to the first and third sampling clock signals.

8. The data recovery apparatus of claim 7, wherein the first, second, and third sub-clock signal generating circuits are interpolators.

9. The data recovery apparatus of claim 6, wherein the rising edge of the fourth sampling clock signal is located between the rising edge of the first sampling clock signal and the rising edge of the second sampling clock signal; the rising edge of the fifth sampling clock signal is located between the rising edge of the second sampling clock signal and the rising edge of the third sampling clock signal; and the rising edge of the sixth sampling clock signal is located between the rising edge of the third sampling clock signal and the rising edge of the first sampling clock signal.

10. The data recovery apparatus of claim 5, wherein the clock signal selecting circuit comprises a plurality of multiplexers that receive the first and second groups of clock signals and output one of the first and second groups of clock signals.

11. A data recovery apparatus for recovering effective data from serial data received via a high-speed serial link, the data recovery apparatus comprising:
- a clock signal generating circuit that generates at least two clock signal groups, comprising first and second clock signal groups, wherein each of the first and second clock signal groups comprises at least two different inputted clock signals having different phases from each other;
- a data recovery circuit that recovers the effective data from the serial data by oversampling the serial data by using a dynamically selected one of the at least two clock signal groups, the selection depending upon the number of edges of clock signals of the selected one of two clock signal groups being within an eye open region of the serial data, wherein the data recovery circuit comprises;
- a clock signal selecting circuit that selects one of the at least two clock signal groups in response to a clock selection signal;
- an oversampler that latches the serial data in response to the selected one of the at least two clock signal groups to output OSR bits of sampling data per each bit of serial data; and
- a clock and data recovery circuit that selects one of the OSR bits of sampling data per each bit of serial data as effective data outputs the clock selection signal in response to logic values of the bits of sampling data,
- wherein the clock signal group output from the clock signal selecting circuit comprises OSR sampling clock signals having edges that define OSR clock sections between the OSR sampling clock signals; and wherein the clock and data recovery circuit comprises:
- a transition-detecting unit that outputs internal signals indicating whether zero-crossing transitions occur during each of the OSR clock sections;
- an adder unit that counts the number of times zero-crossing transitions occurs during each of OSR clock sections, accumulates each of the OSR counts for a predetermined period of time, and compares the OSR accumulated counts with each other, and outputs a count signal;
- a data selecting unit that outputs a sampling-data selection signal in response to the count signal; and
- a data output unit that outputs one of the plurality of sampling data in response to the data selection signal.

12. The data recovery apparatus of claim 11, wherein the clock signal selecting circuit comprises a clock signal-selecting unit that outputs the clock selection signal in response to the count signal.

13. The data recovery apparatus of claim 11, wherein the count signal indicates the clock section having the highest count of the OSR accumulated values, and the data output unit outputs the sampling data latched by the sampling clock signal farthest from the indicated transition part as the effective data in response to the data selection signal.

14. The data recovery apparatus of claim 13, wherein the clock signal selecting circuit selects, from the at least two clock signal groups comprising the first and second clock signal groups, one clock signal group having a plurality of sampling clock signals having edges within the eye open region of the serial data.

15. The data recovery apparatus of claim 12, wherein the clock signal selecting unit monitors the count signal and outputs the clock selection signal such that the clock signal selecting unit deselects the currently selected clock signal group used by the oversampler when all of the OSR clock sections shall have been transition parts.

16. A data recovery method for recovering effective data from serial data, the method being performed by an oversampling data recovery apparatus comprising: a clock signal generating circuit that generates at least two clock signal groups, the at least two clock signal groups comprising first and second clock signal groups, each of the first and second clock signal groups comprising at least two different inputted sampling clock signals, wherein each sampling clock signal has a unique phase; and a data recovery circuit that recovers the effective data from the serial data by sampling the serial data by the sampling clock signals of a dynamically selected one of the at least two sampling clock signal groups, wherein the selection of the selected one of the at least two clock signal groups depends on the number of edges of the clock signals of the selected clock signal group being within an eye open region of the serial data,
- wherein the at least two clock signal groups each comprise OSR sampling clock signals between the edges of which there are OSR clock sections, the data recovery method further comprising:
- sampling and latching OSR bits of sampling data from each bit of the serial data;
- counting the number of times a zero-crossing transition occurs in each of the OSR clock sections and accumulating the count value of each of the OSR clock sections;
- comparing the OSR accumulated count values and outputting a count signal indicating the clock section having the greatest value among the accumulated count value; and outputting the sampling data latched by the sampling clock signal farthest from the clock section indicated by the count signal, as the effective data.

17. The data recovery method of claim 16, further comprising:
monitoring the count signal to deselect the currently selected one of the at least two sampling clock signal groups when a zero-crossing transition shall have occurred in each of the OSR clock sections; and then resetting the OSR count values and sampling the next received serial data by the sampling clock signals of the newly selected one of the at least two sampling clock signal groups.

18. The data recovery method of claim 16, wherein one of the at least two clock signal groups is dynamically selected so as to sample the serial data by a plurality of sampling clock signals having edges within the eye open region of the serial data.

19. A data recovery method for recovering effective data from an input stream of serial data, the method comprising:
oversampling each bit of the serial data at an oversampling rate of OSR using one of a first and second set of phase-shifted sampling clock signals to generate sampling data;
latching OSR bits of the sampling data for each bit of the serial data according to a selected one of the first and second set of OSR sampling clock signals, wherein each set of OSR sampling clock signals comprise at least two different inputted phase shifted clock signals and one of the sets is timewise interstitial to the other and
analyzing the latched OSR bits to determine whether a transition has occurred in the sampling data during clock sections of the selected set of OSR sampling clock signals; and
selecting the other set of OSR sampling clocks signals for subsequent oversampling of each bit of the serial data based on how many of the clocks sections the transition has occurred.

\* \* \* \* \*